US005830301A

United States Patent [19]

Sturzebecher et al.

[11] Patent Number: 5,830,301

[45] Date of Patent: Nov. 3, 1998

[54] METHOD OF MAKING A MULTI-LAYER CONTROLLABLE IMPEDANCE TRANSITION DEVICE FOR MICROWAVES/ MILLIMETER WAVES

[75] Inventors: Dana J. Sturzebecher, Tinton Falls; Michael T. Cummings, Howell; Thomas P. Higgins, Tinton Falls; James R. DeMarco, Howell, all of N.J.

[73] Assignee: The United States of America as represented by the Secretary of the Army, Washington, D.C.

[21] Appl. No.: 799,730

[22] Filed: Feb. 12, 1997

Related U.S. Application Data

[62] Division of Ser. No. 654,949, May 29, 1996, Pat. No. 5,644,276.

[51] Int. Cl.[6] .......................... B32B 31/12; B32B 31/26; H01D 3/06

[52] U.S. Cl. ....................... 156/89.16; 156/263; 333/236; 174/264

[58] Field of Search .......................... 156/89, 263, 89.16; 333/236, 238, 243, 246; 361/778, 790, 792, 795; 174/264, 265, 266

[56] References Cited

U.S. PATENT DOCUMENTS

| | | | |
|---|---|---|---|
| 4,494,083 | 1/1985 | Josefsson et al. . | |
| 4,673,904 | 6/1987 | Landis . | |
| 5,012,047 | 4/1991 | Dohya . | |
| 5,499,005 | 3/1996 | Gu et al. . | |
| 5,644,276 | 7/1997 | Sturzebecher et al. ................. | 333/236 |

*Primary Examiner*—Curtis Mayes
*Attorney, Agent, or Firm*—Michael Zelenka; John M. O'Meara

[57] ABSTRACT

A composite structure including stacked layers of dielectric material having a center conductor in the form of a cylindrical via which is surrounded by an annular dielectric region and an outer ground plane comprised of contiguous pairs of generally circular ground plane segments where each pair of ground plane segments are separated by a pair of spaces or gaps therebetween and wherein the gaps of adjoining layers are mutually oriented by a predetermined angle of rotation, preferably 90°.

9 Claims, 2 Drawing Sheets

METHOD OF MAKING A MULTI-LAYER CONTROLLABLE IMPEDANCE TRANSITION DEVICE FOR MICROWAVES/ MILLIMETER WAVES

This is a division of application Ser. No. 08/654,949, filed May 29, 1996, now U.S. Pat. No. 5,644,234. +gi

GOVERNMENT INTEREST

This invention was made by employees of the United States Government and therefore may be made, sold, licensed, imported and used by or for the Government of the United States of America without the payment of any royalties thereon or therefor.

BACKGROUND OF THE INVENTION

1. Field of the Invention

This invention relates generally to the field of microwave and millimeter wave devices and more particularly to a structure in the form of a multilayer via emulating a coaxial cable having a specific characteristic impedance.

2. Description of Related Art

The efficient transfer of electromagnetic energy such as microwaves (Mw) and millimeter waves (MMw), requires a well defined structure that minimizes reflections and provides a specific characteristic impedance to a signal. Typically such a structure is comprised of a metallized conductor and ground return within a dielectric medium. A coaxial cable is an illustrative example. Based on the physical characteristics of the conductor and dielectric, minimum reflections and characteristic impedance requirements can be satisfied.

The transfer of Mw/MMw signals typically include microstrip, stripline, coplanar waveguide, slot line, rectangular waveguides as well as coaxial cable. The propagation of Mw and MMw signals between planar layers stacked in a 3-dimensional multi-layer configuration is not well established because of the difficulty and/or inability to provide a continuous and well defined conductor/ground structure.

SUMMARY

Accordingly, it is the primary object of the present invention to provide an improvement in microwave/millimeter wave transmission line structures.

It is another object of the invention to provide a microwave/millimeter wave structure for propagating signals between planar layers of a 3-dimensional multi-layer transmission line.

It is a further object of the invention to provide multi-layer coaxial like RF transmission line medium connecting the layers of a stacked 3-dimensional multi-layer microwave/ millimeter wave transmission line structure.

The foregoing and other objects are achieved by a composite structure including stacked layers of dielectric material having a center conductor in the form of a cylindrical via which is surrounded by an annular dielectric region and an outer ground plane comprised of contiguous pairs of generally circular ground plane segments where each pair of ground plane segments are separated by a pair of spaces or gaps therebetween and wherein the gaps of adjoining layers are mutually oriented by a predetermined angle of rotation, preferably 90°.

The individual layers are formed of individual dielectric layers having dielectric material removed in a specific shape, more particularly a central circular region and a pair of arcuate outer regions, with dielectric material remaining therebetween, thus forming the locations of an inner conductor and ground plane. Next a metallic paste is used to fill the specific shapes formed in the dielectric layers. The layers are stacked, one upon the other, with each adjacent layer being mutually rotated with respect to its neighbor by a predetermined angle, preferably 90°. With the layers stacked together, they are pressed and bonded and sintered at high temperatures, producing a resulting structure containing a continuous center conductor and an outer ground plane structure that emulates a coaxial cable and providing a specific characteristic impedance, typically 50 ohms. Low temperature co-fired ceramic (LTCC) comprises a desired dielectric material.

Further scope of applicability of the present invention will become apparent from the detailed description provided hereinafter. However, it should be understood that the detailed description and specific examples disclosed herein while indicating the preferred embodiment and method of fabrication of the invention, are given by way of illustration only, and not limitation, since certain modifications and changes coming within the spirit and scope of the invention will become apparent to those skilled in the art from this detailed description.

BRIEF DESCRIPTION OF THE DRAWINGS

The present invention will become more fully understood from the following detailed description when considered together with the accompanying figures wherein.

DETAILED DESCRIPTION OF THE INVENTION

Figure 1:
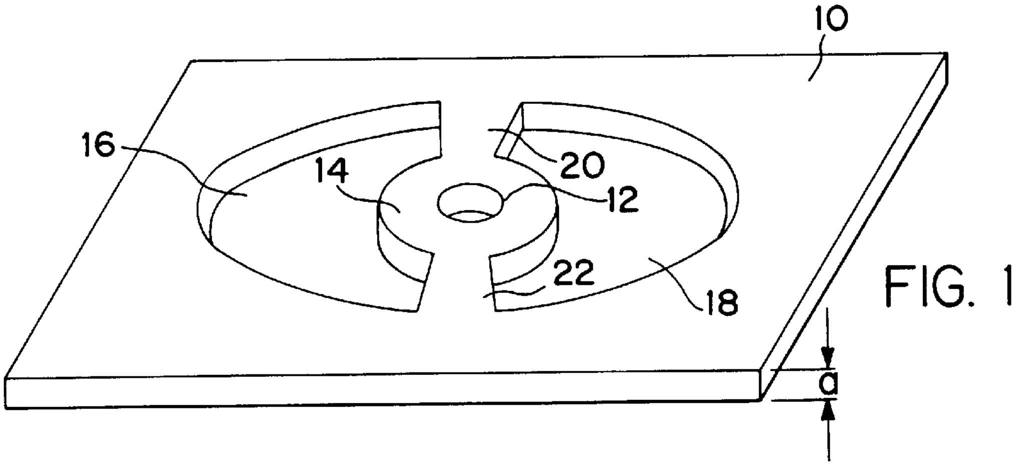
FIG. 1 is a perspective view generally illustrative of one layer of dielectric material with portions of the dielectric material removed for defining the location of a center conductor via and a pair of outer ground plane segments.
Figure 4:
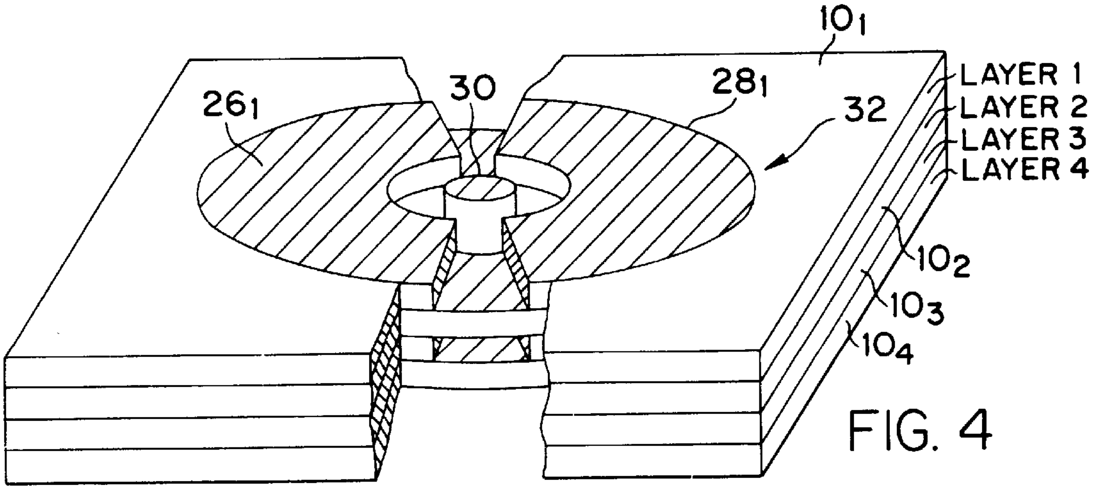
FIG. 4 is a perspective view of a composite structure, partially broken away, of the layers shown in FIG. 3.

Referring now to the figures and more particularly to FIG. 1, shown there at is a generally rectangular piece of dielectric material 10, preferably comprised of unfired low temperature co-fired ceramic (LTCC) tape, a material which is well known. The piece of LTCC tape 10 shown in FIG. 1 is of a constant thickness "a" and which may be, for example, 0.004 inches. The invention is comprised of a plurality of such layers 10 which are stacked together as shown in FIG. 3, where four layers $\mathbf{10}_1$, $\mathbf{10}_2$, $\mathbf{10}_3$ and $\mathbf{10}_4$ are utilized and which are thereafter stacked together and sintered at high temperatures, resulting in a structure shown in FIG. 4.

Further as shown in FIG. 1, the LTCC tape layer 10 includes a central circular opening or hole 12 which is surrounded by an annular region 14 of dielectric material. Adjacent the dielectric region portion 14 of the layer 10 are at least one pair of identical arcuate openings 16 and 18 of a relatively large size compared to the size of the opening 12, and which are mutually separated by flared regions 20 and

Figure 2:
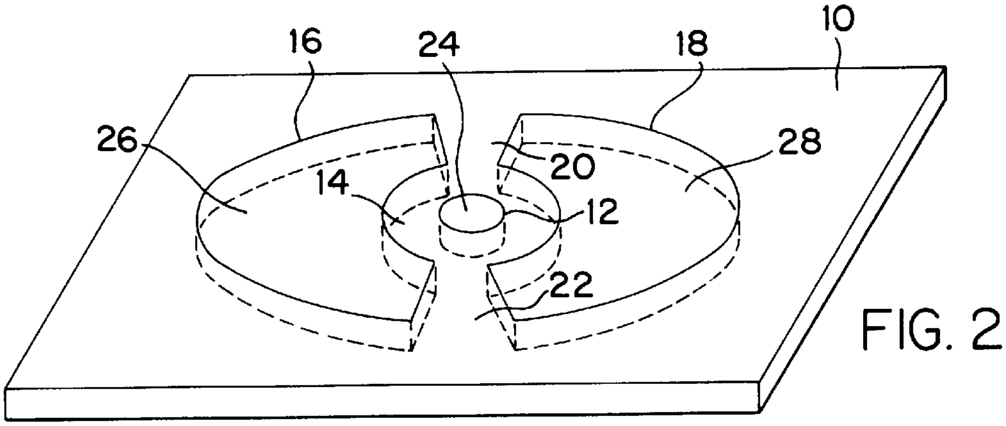
FIG. 2 is a perspective view generally illustrative of the dielectric layer shown in FIG. 1 including metallization filling the voids for the semiconductor and ground plane segments shown in FIG. 1.

22 of dielectric which extend outwardly from the annular region 14. The center opening 12 defines the size and shape of a center conductor via 24 shown in FIG. 2, while the arcuate openings 16 and 18 define the position and shape of at least one pair of metallic ground plane segments 26 and 28, which partially surround the dielectric region 14 and whose ends are mutually separated by the dielectric regions 20 and 22.

Figure 3:
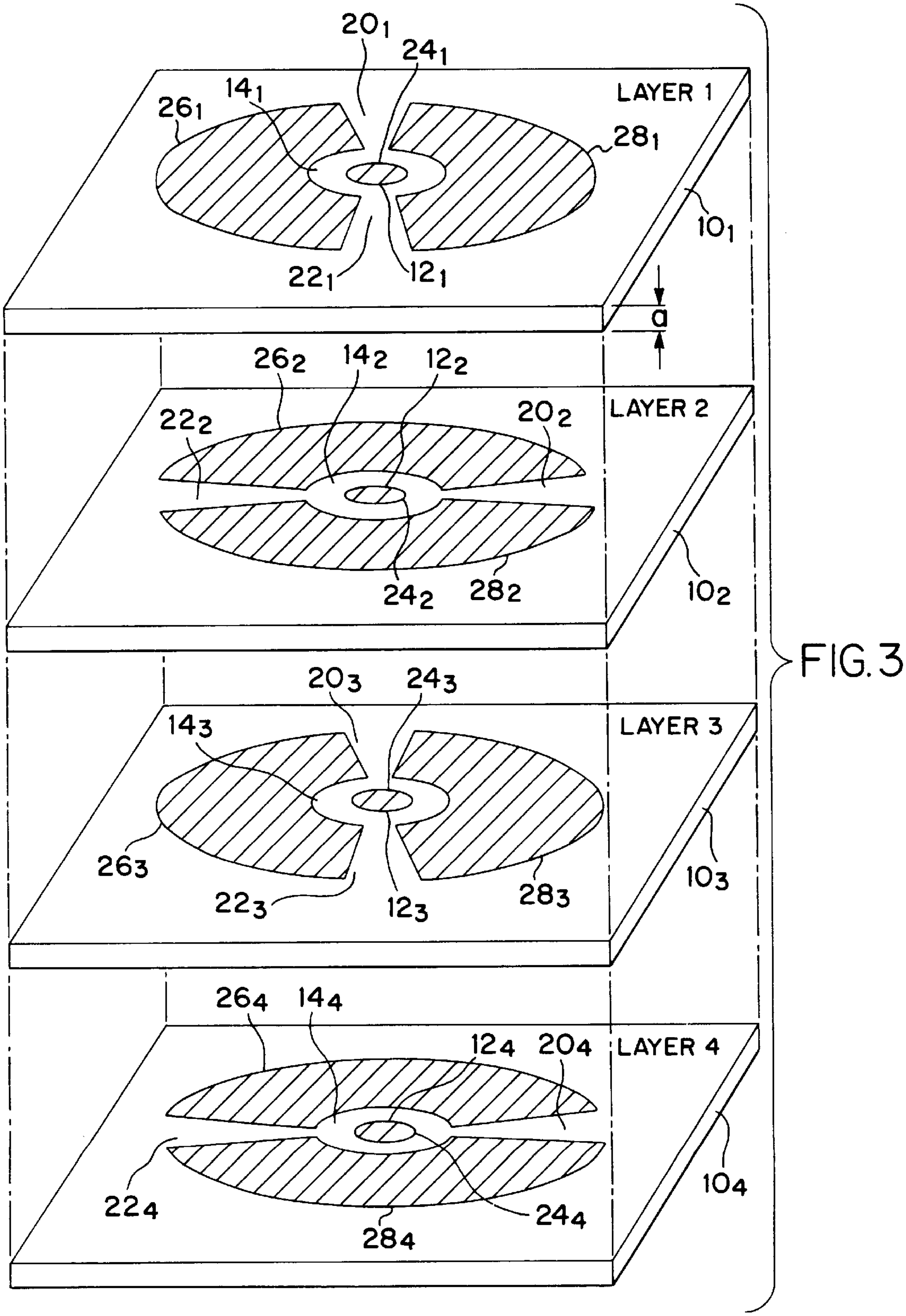
FIG. 3 is an exploded view of four layers of dielectric as shown in FIG. 2 having respective ground plane segments of adjacent layers being mutually rotated by an angle of 90°.

In the fabrication process, a plurality of individual dielectric layers, for example as shown in FIG. 3 and comprising four layers $\mathbf{10}_1$, $\mathbf{10}_2$, $\mathbf{10}_3$ and $\mathbf{10}_4$ have material removed in the specific shapes shown in FIG. 1 using a punch type element that operates similar to a "cookie cutter" which precisely removes a first portion of the dielectric material to form the center hole 12 and at least a second portion and a third portion to form the outer ground plane segment openings 16 and 18. Next, a metallic paste is spread over the dielectric material to fill the voids 12, 16 and 18, created by removing the dielectric. The procedure is repeated for all the layers except that the punch is rotated, for example, 90° for each adjacent layer, as shown in FIG. 3. The angle of the rotation can be varied as desired and the number of layers can also be varied. For purposes of clarification in FIGS. 3 and 4, the subscript numbers in regard to the reference numerals relate to the drifferent layers of material 10.

The layers $\mathbf{10}_1$, $\mathbf{10}_2$, $\mathbf{10}_3$ and $\mathbf{10}_4$ are stacked together, pressed and sintered at high temperatures to produce a resultant composite structure having a continuous center conductor 30 and a ground plane 32 emulating the outer conductor of a coaxial cable having a specific characteristic impedance typically 50 ohms. Such a structure provides a controllable impedance transition device for a 50 ohm transition line such as a microstrip, coplanar waveguide, or stripline through multiple layers of dielectric medium while maintaining a uniform characteristic impedance.

Although low temperature, co-fired ceramic (LTCC) tape is preferable, the device can also be fabricated in polymer, polyimide, or any other substrate material. The characteristic impedance of the device can be controlled by varying the dielectric constant and/or the distance between the center conductor and the ground plane elements.

Applications for such a device include high density microwave/millimeter wave interconnects, antenna feed networks and transmission line distribution networks.

Having thus disclosed what is considered to be the preferred embodiment of the invention and its method of fabrication, it should be known that the same has been made by way of illustration and not limitation. Accordingly, all modifications, alterations and changes coming within the spirit and scope of the invention as set forth in the appended claims, are herein meant to be included.

We claim:

1. A method of fabricating a microwave/millimeter wave transition device from a plurality of layers of dielectric material, comprising the steps of:

removing a first portion of dielectric material from each layer of a plurality of planar layers of dielectric material of substantially constant thickness for defining a center conductor region;

removing at least a second and a third portion of dielectric material from around said center conductor region of each said layer for defining at least one pair of ground plane regions having a mutual separation of dielectric material between the ends thereof;

filling said center conductor region and said ground plane regions with metallization;

stacking said layers so that all metallized center conductor regions are aligned and that mutually adjacent layers have respective metallized ground plane regions which overlay each other while the respective ends thereof are offset by a planar rotation of a predetermined angle; and bonding said plurality of layers together to form a unitary structure having a continuous center conductor and ground plane.

2. The method according to claim 1 wherein said center conductor region is generally circular.

3. The method according to claim 2 wherein said ground plane regions are annular in configuration.

4. The method according to claim 2 wherein said ground plane regions comprise two annular segments.

5. The method according to claim 2 wherein said ground plane regions comprise a pair of substantially identical arcuate regions having predetermined inner and outer radius dimensions.

6. The method according to claim 5 wherein said arcuate region of adjacent layers are rotated relative to one another in respective planes by about 90°.

7. The method according to claim 1 wherein each said layer of dielectric material comprises low temperature co-fired (LTCC) tape.

8. The method according to claim 7 wherein said step of filling said regions with metallization comprises the step of filling said regions with a metallic paste.

9. The method according to claim 8 and wherein said step of bonding includes firing said layers of LTCC tape together.

* * * * *